Sept. 13, 1960 W. J. HOBEL 2,952,221
TURNTABLE
Filed June 13, 1956 2 Sheets-Sheet 1
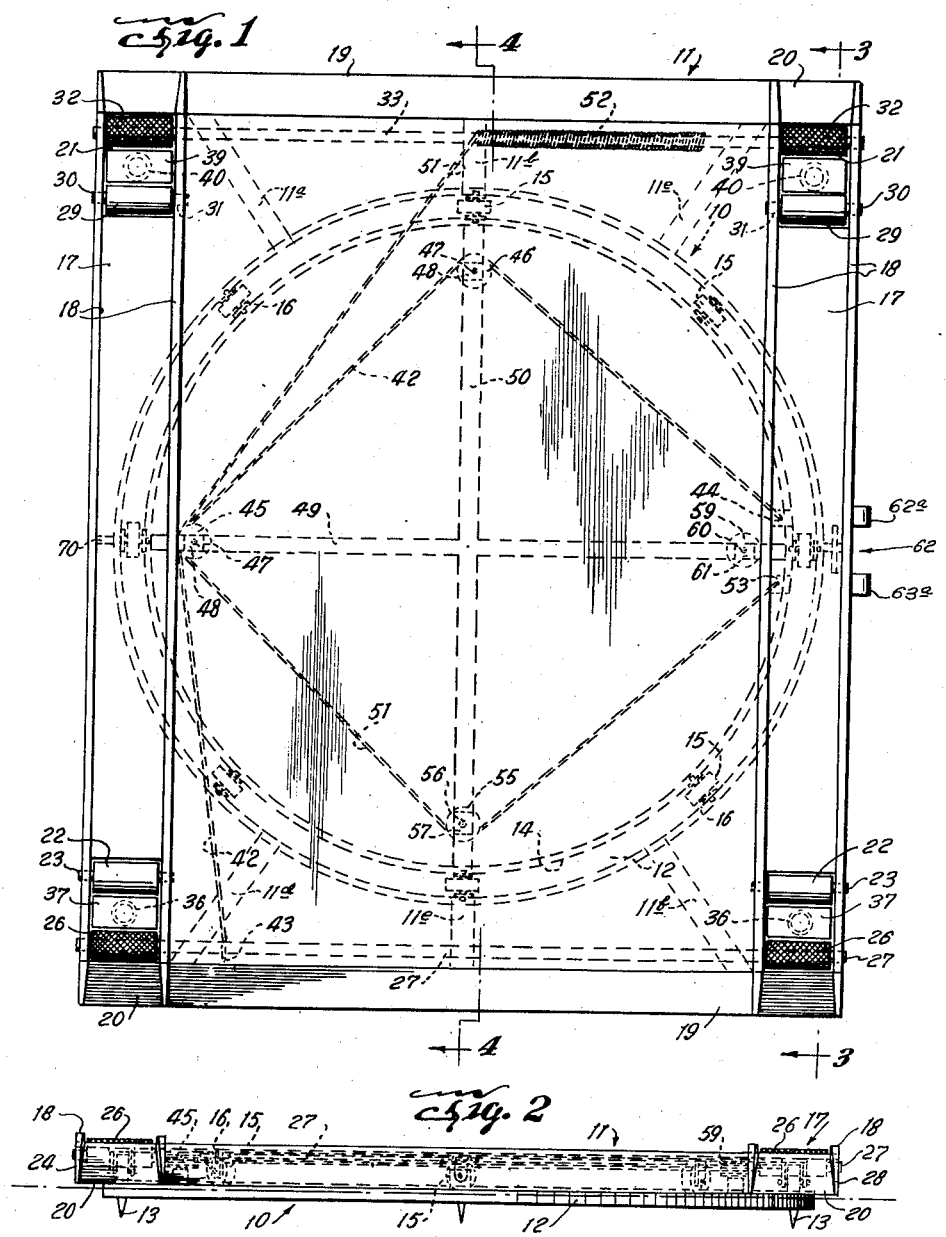
William J. Hobel
INVENTOR
BY
ATTORNEY Sept. 13, 1960

W. J. HOBEL 2,952,221

TURNTABLE

Filed June 13, 1956

*William J. Hobel*
INVENTOR

BY

ATTORNEY

United States Patent Office 2,952,221
Patented Sept. 13, 1960

2,952,221

TURNTABLE

William J. Hobel, 2208 S. Haltom Road, Fort Worth, Tex.

Filed June 13, 1956, Ser. No. 591,135

3 Claims. (Cl. 104—41)

This invention relates to automobile turntables and more particularly to such turntables especially suited to residential use for turning an automobile in a limited space.

The principal object of the invention is to provide a turntable which is propelled by the motive power of the automobile supported thereon.

Another object of the invention is to provide an automobile turntable composed of but a minimum of parts and whose maximum operative area is less in diameter than the length of the automobile rotated thereby.

Still another object of the invention is to provide a turntable which is conveniently portable and requires no permanent base or foundation. Longitudinally extending runways are each traversed by two pairs of parallel rollers, one pair being disposed at each end of each runway and engageable by the wheels of an automobile driven onto the turntable in order that one roller of each pair at one or the other end of the turntable will be rotated by the motor of the automobile through the wheels of the latter. Motive power thus obtained is transmitted to the turntable through cables wound on shafts connecting opposed rollers in the two pairs at each end of the turntable and passing about pulleys mounted on the base or stationary substructure on which the turntable is rotatably mounted. Thus rotation of the turntable through a range of 180° in two directions is made possible for reversibility of an automobile driven onto the turntable from either end thereof.

In the drawing:

Fig. 1 is a top plan view of an automobile turntable constructed according to the invention.

Fig. 2 is an end elevational view.

Figure 3:
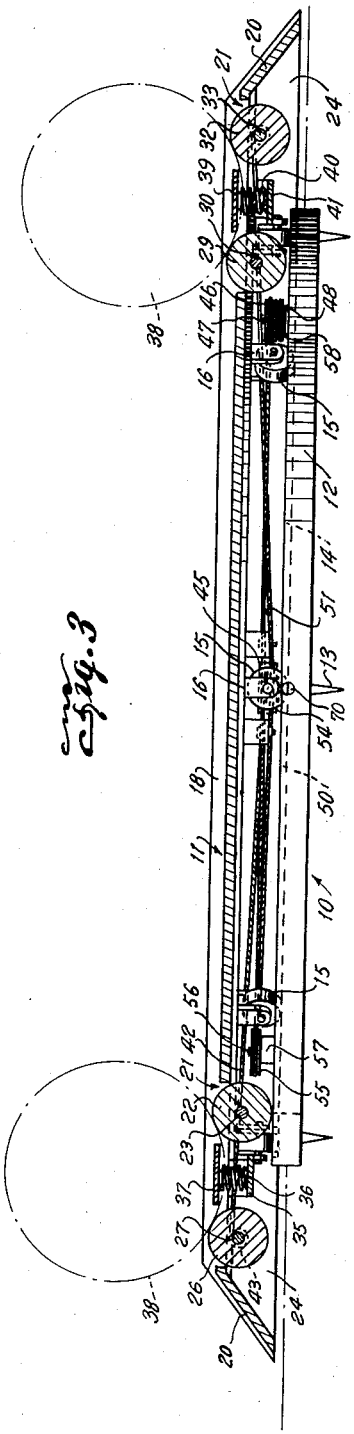
Fig. 3 is a longitudinal sectional view taken on line 3—3 of Fig. 1.

Continuing with a more detailed description of the drawing, reference numeral 10 denotes generally a substructure or base while numeral 11 indicates generally the turntable supported on the base. The base 10 is comprised of a circular track 12 having annularly spaced prongs 13 which pierce the earth and hold the apparatus against shifting its position.

The track 12 has an annular groove 14 in its top surface to accommodate rollers 15, mounted in brackets 16 which are affixed to the undersurface of the turntable 11 in annularly spaced relationship and in alignment with the groove 14 of the track 12. It is evident therefore, that the turntable 11 can turn freely on the base 10, supported by the rollers 15.

Mounted on the turntable 11 adjacent to and parallel with each side thereof is a runway 17, defined by upstanding, parallel flanges 18, which guide the wheels of the automobile along the runways. At each end of the turntable, there is an incline 19, providing ramps 20 in alignment with the ends of the runways 17 over which the automobile is driven onto the turntable. Stiffening plates 11a, 11b, 11c, 11d, 11e, 11f are provided on the underside of the turntable as indicated in Fig. 1.

Adjacent one end of each runway 17 is formed a transverse opening 21. An idler roller 22 is mounted on a shaft 23 whose ends are journalled one in the depending side plate 24 of the turntable 11 and the other in a bearing 25, welded or otherwise affixed to the underside of the turntable and depending therefrom. Companion to each roller 22 is a driving roller 26 which is knurled for better traction. This roller is mounted one on each end of a shaft 27, which extends from side to side of the turntable, one end being journaled in the side plate 24 of the turntable while its other end is journaled in the opposite side plate 28 (Fig. 2).

Figure 4:
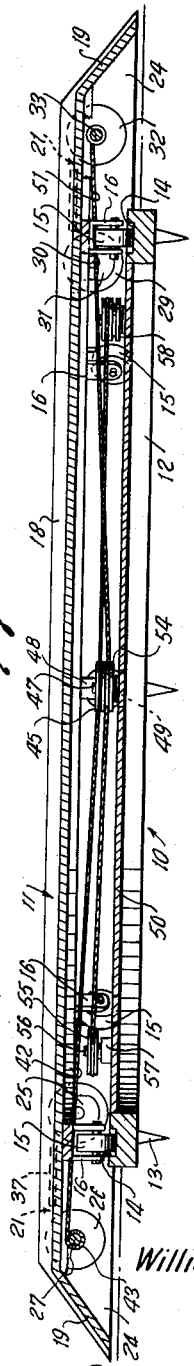
Fig. 4 is a longitudinal sectional view taken on line 4—4 of Fig. 1

At the opposite end of the turntable, an identical roller assembly is provided, consisting of an idler roller 29 disposed in the opening 21 of the turntable on a transverse shaft 30, one end being journaled in the side plate 24 of the turntable while its opposite end is journaled in a bearing 31 affixed to and depending from the underside of the turntable 11. A drive roller 32, companion to each idler roller 29, is mounted on each end of a shaft 33 which extends from side to side of the turntable 11 and whose ends are journaled in the side members 24 and 28 of the turntable, as shown in Fig. 4. The roller 32 is likewise knurled for better traction.

Supported under each of the roller openings 21, between the rollers 22 and 26 is a plate 35 (Fig. 3) which supports a heavy coil spring 36. The spring 36, in turn, supports a safety plate 37 between the said rollers 22 and 26 above their axes. This plate serves to prevent persons from catching their feet accidentally between the rollers, the springs 36 being of sufficient strength to support the weight of a child or adult but will yield to the weight of an automobile so that the wheels 38, shown in dotted lines in Fig. 3, will engage the rollers 22 and 26 and the rollers 29 and 32 at the opposite end of the turntable where a like plate 39 is supported by a coil spring 40 which, in turn, is supported on a plate 41 below the roller opening 21.

To operate the turntable 11 by power supplied by the motor of the vehicle driven onto the turntable, a cable 42 is attached at 43 to the shaft 27 and extends to an ear 44 (Fig. 1) affixed to the inner surface of the annular track 12 after passing around pulleys 45 and 46. Pulleys 45 and 46 are each mounted on a steel shaft 47, journaled in a bearing block 48, one mounted on a transverse brace member 49 (Fig. 1) while the other is mounted on a longitudinal brace member 50, whose ends are joined also to the inner surfaces of the annular track 12.

A second cable 51 is wound at one end 52 (Fig. 1) on the transverse shaft 33 and its opopsite end is attached to an ear 53 adjacent the ear 44, affixed to the inner surface of the annular track 12 after passing about a pulley 54 (Figs. 3 and 4) which is mounted on the same shaft 47 with the pulley 45 and a pulley 55, mounted on a steel shaft 56, journaled in a bearing block 57 at the end of the longitudinal brace member 50 opposite the pulley 46.

In operation: A vehicle is driven upon the turntable 11 and its wheels 38 are positioned as shown in dotted lines in Fig. 3. Since the turntable 11 has identical operating means at its ends, a vehicle can be driven onto the same from either end whereby its rear wheels are adapted to be positioned between the rollers of each pair at one end of the turntable. By placing the vehicle transmission in gear and accelerating the engine, the driven wheels of the vehicle will, by traction, rotate the rollers 22—26 or 29—32, depending on the position of the vehicle on the turntable. The degree of acceleration will, of course, determine the speed of rotation of the turntable.

As the rollers 26 or 32 are rotated the shafts 27 or 33, respectively will be revolved and in the case of the shaft 33, the cable 51 is wound thereon and, being brought under tension, pulls the turntable around a distance permitted by the companion cable 42 whose length is predetermined so that rotation of the turntable in each direction is limited to 180°. The pulleys 45, 46, 54 and 55, earlier described and two additional pulleys 58 (Figs. 3 and 4) and 59 (Fig. 1), are so spaced on the transverse member 49 and longitudinal member 50 of the base 10 that the required leverage is imposed by the cables 42 and 51 through these pulleys to revolve the turntable. The pulley 58 is mounted on the same steel shaft 47 with the pulley 46 and pulley 59 is mounted on a steel shaft 60 affixed to a bearing block 61 which, in turn, is supported on the transverse member 49.

Figure 5:
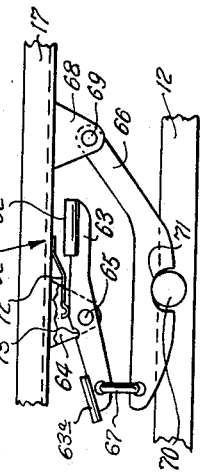
Figure 5 is a fragmentary elevational view, on an enlarged scale.

In the event a householder has installed the turntable in his driveway to his garage and desires to drive his car into the garage he simply travels over the rollers on the turntable with perhaps slightly increased speed so that the wheels will not stall between the rollers. In this manner, the driving rollers 26, or 32 will not be rotated by the wheels of the vehicle driven thereover and consequently the turntable will remain stationary. However, a locking device 62 (Fig. 5), is provided for holding the turntable in normal position. This device can be mounted under either runner 17 for engagement with pins 70 which extend outwardly from the track 12 on the transverse center line through the base 10. In Fig. 5 the pair of lugs 68 are mounted on the underside of runner 17. These lugs rotatably support the lever 66 by means of the bearing-pin 69. A second pair of lugs 64 rotatably support the lever 63 by means of the bearing pin 65. The lever has two laterally extending foot pedals 62a and 63a, one mounted at each end. The link 67 located under the pedals 63a connects lever 63 to the free end of lever 66. The lever 66 has notch 71 which engages pin 70 when the locking device is over it and pedal 63a is depressed. This secures the turntable in stationary position. Depressing pedal 62a releases lever 66 from engagement with pin 70, freeing the turntable. A spring 72, mounted on the runner 17 above lever 63, engages a notch 73 in the upper edge of lever 63 to hold the locking device open when lever 66 is disengaged from pin 70 by depressing the pedal 62a.

Manifestly, the construction as shown and described is capable of some modification and such modification as may be construed to fall within the scope and meaning of the appended claims is also considered to be within the spirit and intent of the invention.

What is claimed is:
1. A vehicle turntable comprising a circular base, an elongate turntable supported rotatably on said base, a runway parallel with each side of said turntable having a ramp at each end, a shaft supported by said turntable under each end thereof and traversing said runways, a pair of rollers at each end of each of said runways, one roller of each pair being mounted on an end of said shaft and engaged by a wheel of a vehicle on said turntable to rotate said shaft thereby, a cable wound on each of said shafts and having an end connected to said base whereby alternate rotation of said shafts will impose tension on said cables to rotate said turntable.

2. Apparatus for turning vehicles comprising a base, an elongate turntable rotatably supported on the base and having a ramp at each end on which a vehicle is driven onto the turntable, a runway along each side of the turntable connecting the ramps, a pair of parallel rollers traversing the runways at each end and engageable by the driven wheels of the vehicle on the turntable, a transverse shaft carried by each end of the turntable and actuated by one roller of each pair on each end thereof, and flexible means connected between the shaft and the base and adapted to be wound on the shaft by the traction of the driven wheels on the rollers to rotate the shaft.

3. Apparatus for turning vehicles comprising a stationary base, a turntable rotatably supported thereon having runways for guiding the wheels of a vehicle driven onto the turntable, rollers supported by the turntable and disposed transversely of each end of each of the runways and engageable by the driven wheels of the vehicle to rotate them, a shaft supporting one of the rollers on each end, and a cable connected between the shaft and the base and adapted to be wound on the shaft when the driven wheels are in motion against the rollers.

References Cited in the file of this patent

UNITED STATES PATENTS

| | | |
|---|---|---|
| 967,581 | Sleph | Aug. 16, 1910 |
| 1,225,030 | Haynes | May 8, 1917 |
| 1,358,748 | Jones | Nov. 16, 1920 |
| 1,384,569 | Rice | July 12, 1921 |
| 1,480,872 | Tapping | Jan. 15, 1924 |
| 1,647,678 | Willbanks | Nov. 1, 1927 |
| 1,661,123 | Kocsis | Feb. 28, 1928 |
| 1,663,832 | Flynn | Mar. 27, 1928 |
| 1,772,075 | Exon | Aug. 5, 1930 |
| 1,881,033 | Smith | Oct. 4, 1932 |
| 2,177,941 | Knudson et al. | Oct. 31, 1939 |
| 2,583,201 | Bennett | Jan. 22, 1952 |
| 2,709,362 | Marcus et al. | May 31, 1955 |